United States Patent
Tsai (10) Patent No.: US 10,115,542 B1
(45) Date of Patent: Oct. 30, 2018

(54) KEYBOARD

(71) Applicant: Primax Electronics Ltd., Taipei (TW)

(72) Inventor: Lei-Lung Tsai, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 15/812,771

(22) Filed: Nov. 14, 2017

(30) Foreign Application Priority Data

Aug. 18, 2017 (TW) .............................. 106128124 A (51) Int. Cl.
*H01H 13/705* (2006.01)

(52) U.S. Cl.
CPC ..... *H01H 13/705* (2013.01); *H01H 2221/044* (2013.01); *H01H 2231/002* (2013.01); *H01H 2233/07* (2013.01)

(58) Field of Classification Search
CPC ...... H01H 13/14; H01H 13/704; H01H 13/86; H01H 13/88; H01H 2215/00; H01H 2215/004; H01H 2215/05; H01H 2221/036; H01H 2221/058; H01H 2223/044; H01H 2229/034; H01H 2229/046; H01H 2239/052
USPC ....... 200/5 A, 344, 314, 341, 513, 521, 345, 200/512, 517, 247, 250, 302.2, 339
See application file for complete search history.

(56) References Cited

U.S. PATENT DOCUMENTS

| | | | | |
|---|---|---|---|---|
| 5,950,810 A * | 9/1999 | Pan | .......... | H01H 3/125 200/344 |
| 8,759,702 B2 * | 6/2014 | Huang | .......... | H01H 3/125 200/314 |
| 2005/0253643 A1 * | 11/2005 | Inokawa | ............ | G06F 3/016 327/517 |
| 2011/0147182 A1 * | 6/2011 | Chen | .......... | H01H 13/83 200/314 |

* cited by examiner

*Primary Examiner* — Ahmed Saeed
(74) *Attorney, Agent, or Firm* — Kirton McConkie; Evan R. Witt (57) ABSTRACT

The present invention relates to a keyboard, including a first baseboard, a second baseboard, a deformation element, a key cap, and a connecting element. The deformation element is disposed between the first baseboard and the second baseboard and is capable of deforming according to a received voltage signal. The deformation element drags the second baseboard to move in a first direction when the deformation element receives the voltage signal and therefore deforms to be in an extended state, so that the key cap is at a first height. The deformation element pushes the second baseboard to move in a second direction when the deformation element does not receive the voltage signal and therefore deforms to be in a bent state, so that the key cap is at a relatively shorter second height.

9 Claims, 6 Drawing Sheets

KEYBOARD

FIELD OF THE INVENTION

The present invention relates to a keyboard, and in particular, to a keyboard in which the height of a key cap is changeable.

BACKGROUND OF THE INVENTION

Common peripheral input devices of a computer include a mouse, a keyboard device, a trackball device, and the like. The keyboard can be used by users to directly input words and symbols to the computer and is therefore draw attention from users and input device manufacturers. A keyboard including a scissor-type connecting element is pretty common.

Figure 1:
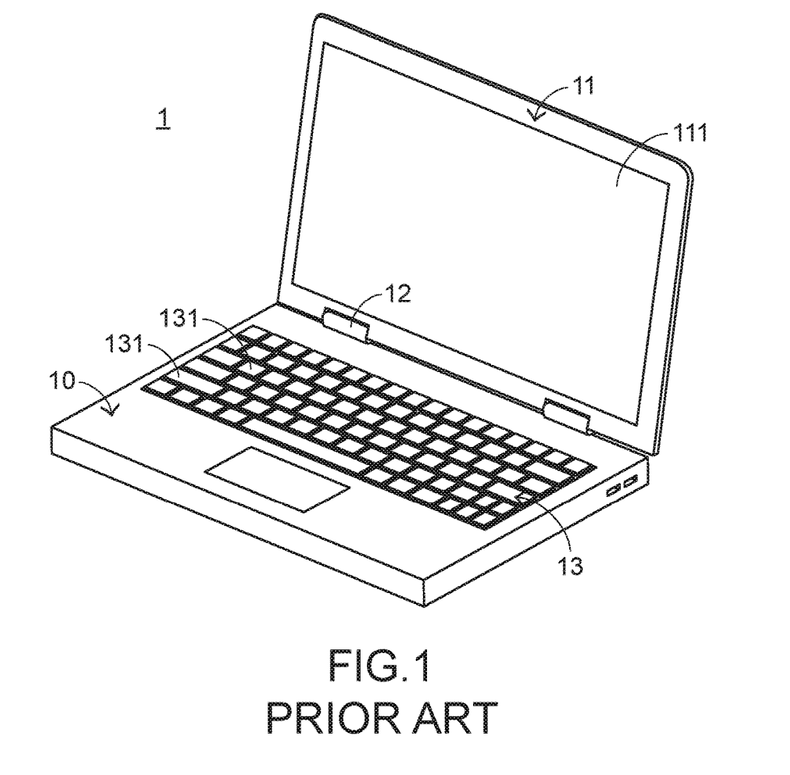
FIG. 1 is a schematic structural diagram of a conventional notebook computer.

Referring to FIG. 1, FIG. 1 is a schematic structural diagram of a conventional notebook computer. The conventional notebook computer 1 includes a base 10, an upper cover 11, a rotation shaft 12, and a keyboard 13. Moreover, a screen 111 is disposed on the upper cover 11, and the upper cover 11 may cover the base 10 or may be raised to be in a use state by means of rotation of the rotation shaft 12. The keyboard 13 is disposed on the base 10 and is capable of being operated by a user to generate a corresponding key signal. That is, the keyboard 13 is in a state in which the computer is used.

Figure 2:
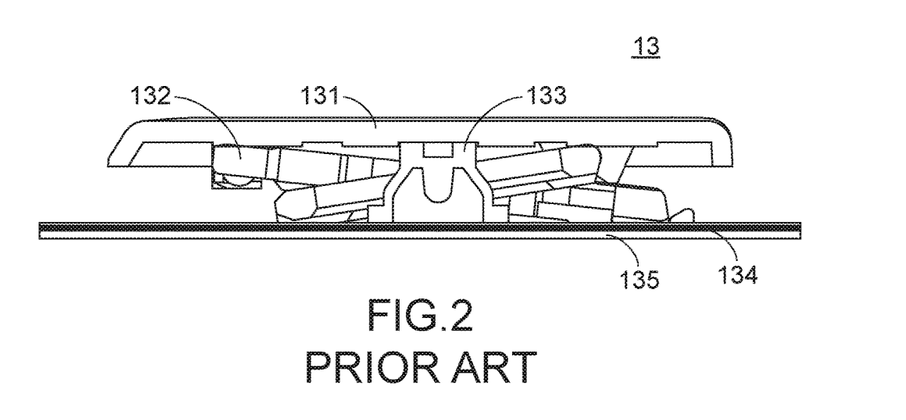
FIG. 2 is a schematic cross-sectional structural diagram of a part of a conventional keyboard.

The structure of the keyboard 13 is subsequently described. One key in the keyboard 13 is used as an example for describing the structure of the keyboard 13. Referring to FIG. 2, FIG. 2 is a schematic cross-sectional structural diagram of a part of a conventional keyboard. The keyboard 13 includes key caps 131, scissor-type connecting elements 132, elastic rubber bodies 133, a membrane switch circuit 134, and a baseboard 135, and the baseboard 135 is configured to bear the second key caps 131, the scissor-type connecting elements 132, the elastic rubber bodies 133, and the membrane switch circuit 134. The scissor-type connecting elements 132 are configured to connect the baseboard 135 and the key caps 131.

The scissor-type connecting elements 132 are located between the baseboard 135 and the key caps 131 and separately connect the baseboard 135 to the key caps 131, and the elastic rubber bodies 133 are surrounded by the scissor-type connecting elements 132. The membrane switch circuit 134 has a plurality of key connecting points (not shown). The key connecting points output corresponding key signals when being triggered. The elastic rubber bodies 133 are disposed on the membrane switch circuit 134 and one elastic rubber body 133 corresponds to one key connecting point. When an elastic rubber body 133 is triggered, the elastic rubber body 133 deforms and presses a corresponding key connecting point in the membrane switch circuit 134, to generate a key signal.

The operation of a conventional key cap 131 when being pressed by a user is described below. In FIG. 1, when a user presses the key cap 131, the key cap 131 is under a stress and pushes the scissor-type connecting element 132 to move. Therefore, the key cap 131 may move downwards relative to the baseboard 135 and presses a corresponding elastic rubber body 133. At this time, the elastic rubber body 133 deforms and presses the membrane switch circuit 134, to trigger a key connecting point of the membrane switch circuit 134, so that the membrane switch circuit 13 outputs a corresponding key signal. When the user stops pressing the key cap 131, the key cap 131 is no longer under a stress and stops pressing the elastic rubber body 133, so that the elastic rubber body 133 recovers to the original state due to its elasticity and meanwhile provides an upward elastic restoring force, and the key cap 131 is therefore pushed back to the position before being pressed.

Figure 3:
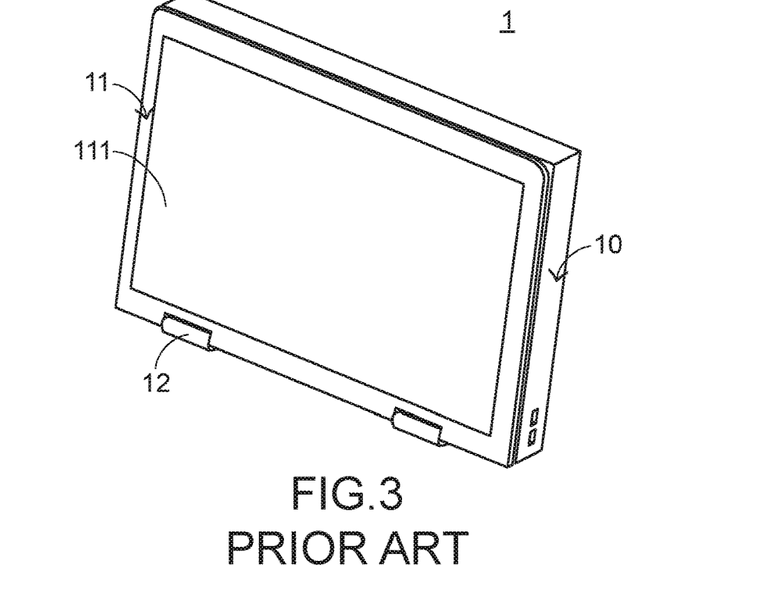
FIG. 3 is a schematic structural diagram of a conventional notebook computer in a touch mode.

In recent years, touch type apparatuses may enable a user to operate directly with fingers or by using a touch pen, have an advantage of easy operation, and therefore are favoured by users and large manufacturers. Therefore, the screen 111 in the notebook computer 1 may use a touch type screen and therefore have a touch function. In another aspect, some manufacturers further launch a notebook computer capable of being bent inversely. Referring to FIG. 3, FIG. 3 is a schematic structural diagram of a conventional notebook computer in a touch mode. The upper cover 11 of the notebook computer 1 shown in FIG. 3 is turned over towards the bottom of the base 10 by means of the rotation shaft 12, so that the upper cover 11 is turned over to a state at which the upper cover 11 is in contact with the bottom of the base 10 and the screen 111 is exposed, that is, in an appearance similar to that of a touch type apparatus. The screen 111 is a touch type screen, and therefore a user may use the notebook computer 1 as a touch type apparatus.

However, it is difficult for a user to hold the notebook computer 1 because the keyboard 13 of the notebook computer 1 in a touch mode is exposed outside and the key cap 131 may move downwards to form a dent since the user may press the key cap 131 with hands when holding the notebook computer 1. In addition, the notebook computer 1 also generates a key signal when the key cap 131 is touched by mistake when the notebook computer 1 is held by the user, so as to generate a false operation, resulting in difficulty in user operation.

Therefore, a keyboard in which the height of a key cap is changeable along with a change in the appearance of a notebook computer is needed.

SUMMARY OF THE INVENTION

An objective of the present invention is providing a keyboard in which the height of a key cap is changeable.

In a preferable embodiment, the present invention provides a keyboard, disposed in a notebook computer, where the keyboard includes a first baseboard, a second baseboard, a deformation element, a key cap, and a connecting element. The second baseboard is disposed at one side of the first baseboard, and the deformation element is disposed between the first baseboard and the second baseboard, separately connected to the first baseboard, the second baseboard, and a power supply circuit of the notebook computer, and configured to deform according to a voltage signal provided by the power supply circuit. The key cap is located above the first baseboard, the second baseboard, and the deformation element and is capable of moving relative to the first baseboard and the second baseboard, and the connecting element is separately connected to the key cap, the first baseboard, and the second baseboard. The deformation element drags the second baseboard to move in a first direction when the deformation element receives the voltage signal and therefore deforms to be in an extended state, so that the key cap is at a first height; and the deformation element pushes the second baseboard to move in a second direction when the deformation element does not receive the voltage signal and therefore deforms to be in a bent state, so that the key cap is at a second height that is shorter than the first height.

In brief, in the keyboard of the present invention, the first baseboard and the second baseboard are connected by means of the deformation element, and the height of the key cap is changed according to the status of the deformation element. When a user wants to reduce the height of the key cap, the deformation element is controlled not to receive the voltage signal from the power supply circuit, so that the deformation element is changed to be in a bent state and pushes the second baseboard to move in a second direction, the second frame is dragged by the moving second baseboard, and the first frame swings correspondingly. Therefore, the height of the key cap can be reduced.

DETAILED DESCRIPTION OF THE PREFERRED EMBODIMENT

Figure 4:
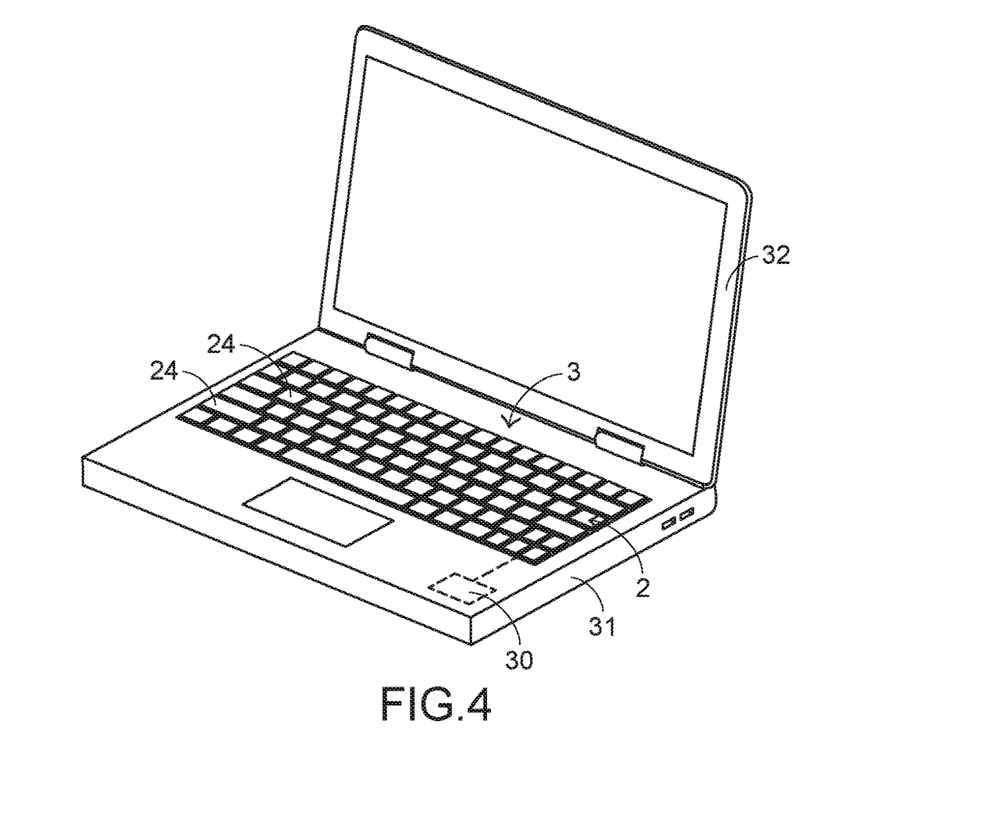
FIG. 4 is a schematic structural diagram of an appearance of a keyboard and a notebook computer according to a preferable embodiment of the present invention.
Figure 5:
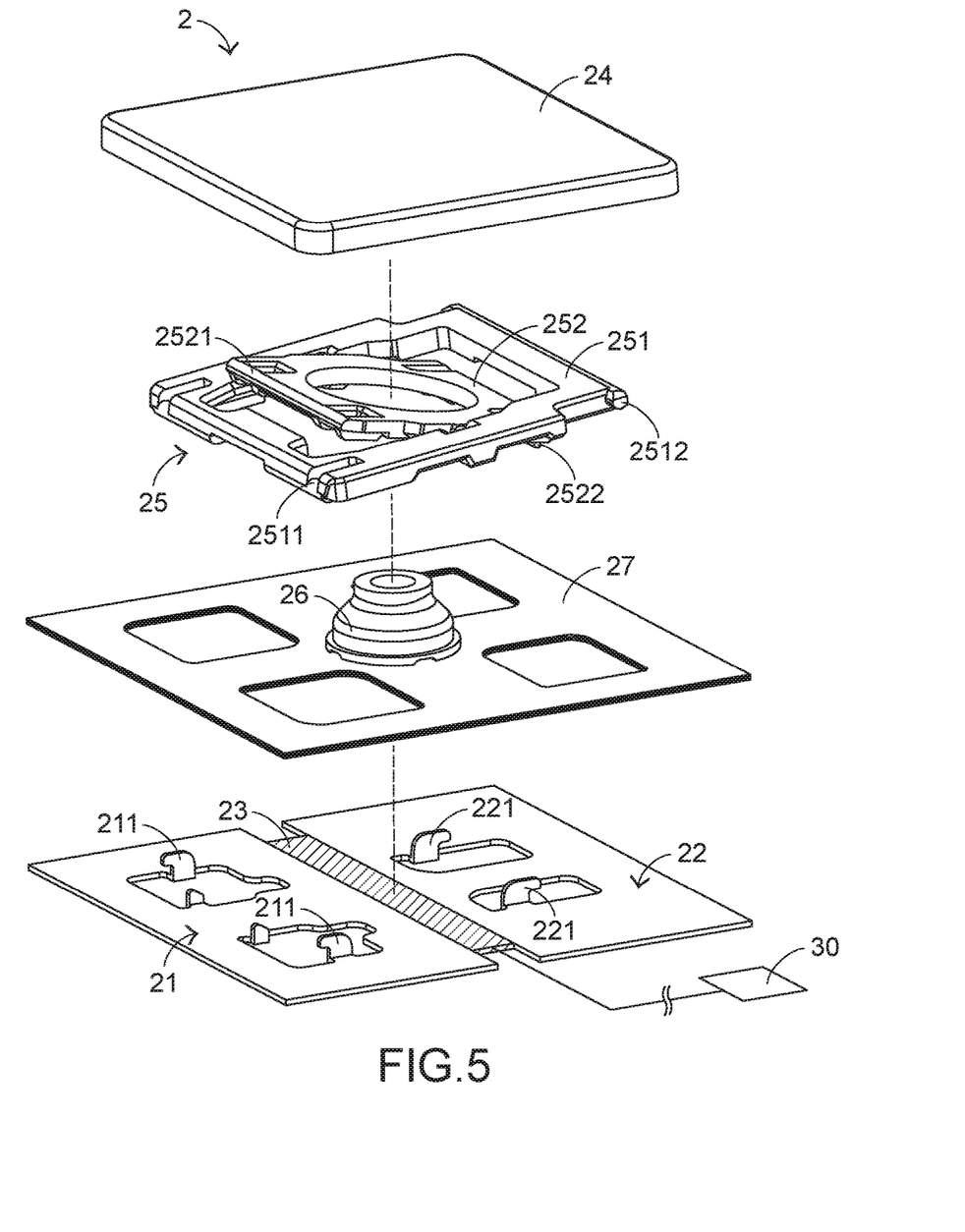
FIG. 5 is a schematic structural exploded diagram of a part of a keyboard according to a preferable embodiment of the present invention.
Figure 6:
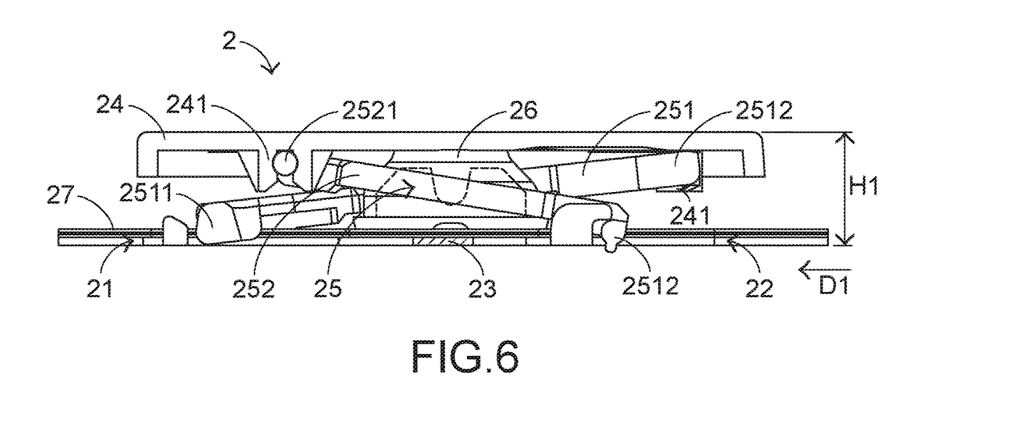
FIG. 6 is a schematic cross-sectional structural side view of a part of a keyboard in an operation state according to a preferable embodiment of the present invention.

The present invention provides a keyboard in which the height of a key cap is changeable, so as to resolve the technical problem in the existing technology. Referring to FIG. 4, FIG. 5, and FIG. 6, FIG. 4 is a schematic structural diagram of an appearance of a keyboard and a notebook computer according to a preferable embodiment of the present invention, FIG. 5 is a schematic structural exploded diagram of a part of a keyboard according to a preferable embodiment of the present invention, and FIG. 6 is a schematic cross-sectional structural side view of a part of a keyboard in an operation state according to a preferable embodiment of the present invention. FIG. 4 shows a notebook computer 3. The notebook computer 3 includes a base 31, an upper cover 32, and a power supply circuit 30 located inside the notebook computer 3. In addition, a keyboard 2 of the present invention is disposed on the base 31 of the notebook computer 3. The upper cover 32 is capable of rotating relative to the base 31, so that the notebook computer 2 can be in different operation modes. For example, when the upper cover 32 covers the base 31, the notebook computer 3 is in a sleep mode or a shutdown mode; when the upper cover 32 is raised to expose the keyboard 2 on the base 31, the notebook computer 3 is in a state in which the computer is used.

In FIG. 5 and FIG. 6, the keyboard 2 includes a first baseboard 21, a second baseboard 22, a deformation element 23, a key cap 24, a connecting element 25, an elastic element 26, and a switch circuit board 27. In addition, the first baseboard 21, the second baseboard 22, and the deformation element 23 of the key structure 2 are disposed on the base 31 of the notebook computer 3. The second baseboard 22 is disposed at one side of the first baseboard 21, and the deformation element 23 is disposed between the first baseboard 21 and the second baseboard 22 and separately connected to the first baseboard 21 and the second baseboard 22. In addition, the deformation element 23 is further electrically connected to the power supply circuit 30 of the notebook computer 3, and the deformation element 23 may receive a voltage signal from the power supply circuit 30 to deform. In this preferable embodiment, the first baseboard 21 is fixed on the base 31, and the second baseboard 22 may move horizontally on the base 31 relative to the first baseboard 21.

The key cap 24 is located above the first baseboard 21, the second baseboard 22, and the deformation element 23 and exposed out of the base 31, and the key cap 24 may move vertically relative to the first baseboard 21 and the second baseboard 22. The connecting element 25 is separately connected to the key cap 24, the first baseboard 21, and the second baseboard 22, and fixes the key cap 24 onto the first baseboard 21 and the second baseboard 22 in a movable manner. The connecting element 25 includes a first frame 251 and a second frame 252. A first end 2511 of the first frame 251 is connected to the first baseboard 21, and a second end 2512 of the first frame 251 is connected to the key cap 24. The second frame 252 is combined with the first frame 251 and is capable of swinging relative to the first frame 251. A first end 2521 of the second frame 252 is connected to the key cap 24, and a second end 2522 of the second frame 252 is connected to the second baseboard 22.

The key cap 24 is provided with a plurality of key cap fixing portions 241. The plurality of key cap fixing portions 241 extends output an inner surface of the key cap 24 and is capable of fixing the second end 2512 of the first frame 251 and the first end 2521 of the second frame 252 onto the key cap 24. The first baseboard 21 is provided with a plurality of first fixing portions 211. The plurality of first fixing portions 211 extends out of an upper surface of the first baseboard 21 and has a function of fixing the first end 2511 of the first frame 251 onto the first baseboard 21. Likewise, the second baseboard 22 is provided with a plurality of second fixing portion 221. The plurality of second fixing portion 221 extends output an upper surface of the second baseboard 22 and has a function of fixing the second end 2522 of the second frame 252 onto the second baseboard 22. By means of the key cap fixing portions 241, the first fixing portions 211, and the second fixing portions 221, the key cap 24 may be connected onto the first baseboard 21 and the second baseboard 22 through the first frame 251 and the second frame 252. In this preferable embodiment, the plurality of first fixing portions 211 is integrally formed with the first baseboard 21, and the plurality of second fixing portions 221 is integrally formed with the second baseboard 22.

Figure 7:
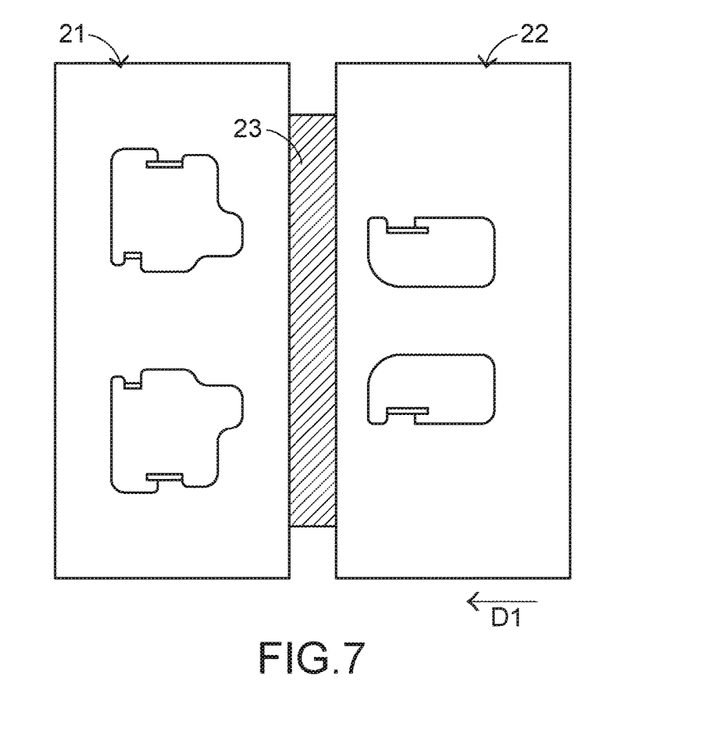
FIG. 7 is a schematic cross-sectional structural side view of a part of a keyboard in a shutdown state according to a preferable embodiment of the present invention.

The switch circuit board 27 is disposed on the first baseboard 21, the second baseboard 22, and the deformation element 23, and is capable of being triggered according to a movement of the key cap 24, so as to output a key signal corresponding to the key cap 24. The elastic element 26 is disposed between the key cap 24 and the switch circuit board 27 and is capable of being pushed by the key cap 24 to trigger the switch circuit board 27. In this preferable embodiment, the switch circuit board 27 is a membrane switch circuit, and the elastic element 26 is an elastic rubber body. The structure of the keyboard 2 formed by combining all the elements is shown in FIG. 7. In this case, the key cap 24 is at a first height H1.

Figure 8:
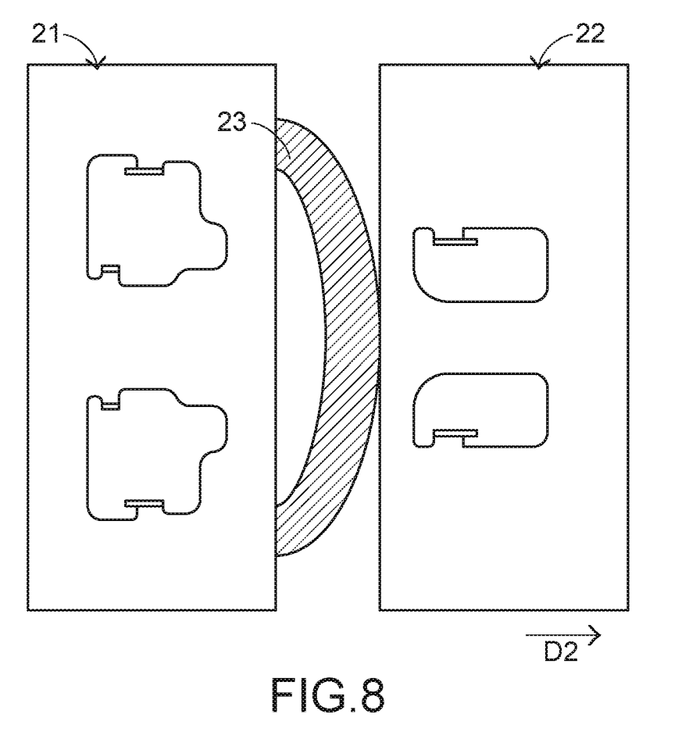
FIG. 8 is a schematic structural bottom view of a part of a keyboard in a shutdown state according to a preferable embodiment of the present invention.

Subsequently, the operation of the keyboard 2 of the present invention is described. Referring to FIG. 7 and FIG. 8, FIG. 7 is a schematic cross-sectional structural side view of a part of a keyboard in a shutdown state according to a preferable embodiment of the present invention, and FIG. 8 is a schematic structural bottom view of a part of a keyboard in a shutdown state according to a preferable embodiment of the present invention. When the notebook computer 3 is in a sleep mode or a shutdown mode, the upper cover 32 of the notebook computer 3 covers the base 31, and the keyboard 2 of the present invention is in a shutdown state in FIG. 7. At this time, the power supply circuit 30 is not driven, so that the deformation element 23 does not receive a voltage signal and therefore is in a bent state, as shown in FIG. 8. Due to the bent state of the deformation element 23, the deformation element 23 pushes the second baseboard 22 to move in a second direction D2, the second frame 252 is dragged by the second baseboard 22, and the first frame 251 swings correspondingly, so that the key cap 24 is at a second height H2. In addition, the second height H2 is shorter than the first height H1.

Figure 9:
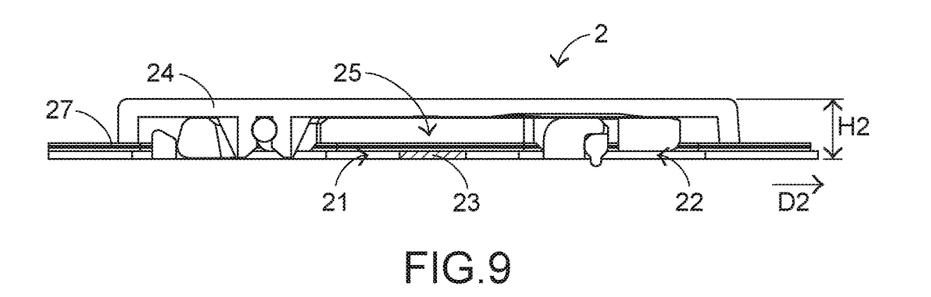
FIG. 9 is a schematic structural bottom view of a part of a keyboard in an operation state according to a preferable embodiment of the present invention.

Referring to FIG. 6 and FIG. 9, FIG. 9 is a schematic structural bottom view of a part of a keyboard in an operation state according to a preferable embodiment of the present invention. When the notebook computer 3 is driven from a sleep mode or a shutdown mode, the power supply circuit 30 is driven to output a voltage signal, so that the deformation element 23 of the keyboard 2 receives the voltage signal to change to an extended state from a bent state. At this time, the deformation element 23 drags the second baseboard 22 to move in a first direction D1, the second frame 252 is pushed by the second baseboard 22, and the first frame 251 swings correspondingly, so that the key cap 24 changes from the second height H2 to the first height H1. In this preferable embodiment, the deformation element 23 is made of a shape memory alloy (SMA).

Figure 10:
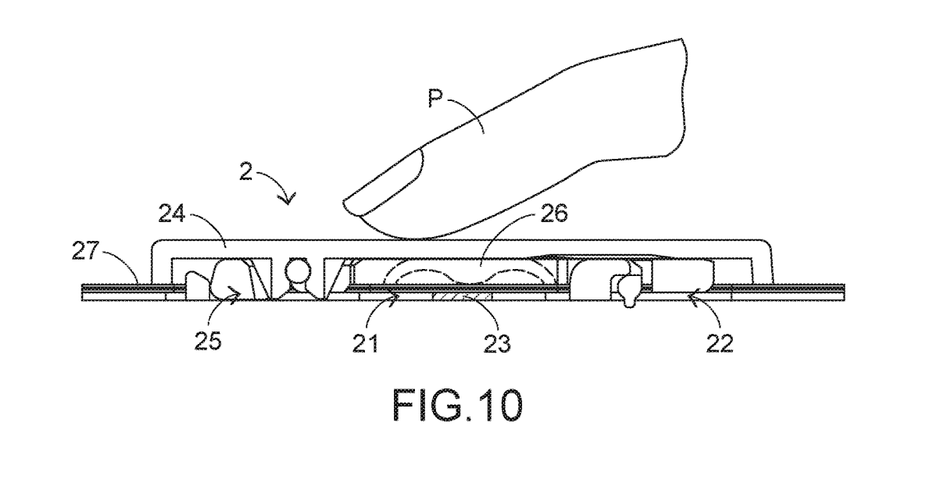
FIG. 10 is a schematic cross-sectional structural side view of a part of a key cap of a keyboard when being pressed according to a preferable embodiment of the present invention.

Subsequently, the operation of the key cap 24 of the keyboard 2 of the present invention when being pressed is described. Referring to FIG. 6 and FIG. 10, FIG. 10 is a schematic cross-sectional structural side view of a part of a key cap of a keyboard when being pressed according to a preferable embodiment of the present invention. When a finger P of a user applies a force to press the key cap 24, the key cap 24 is under a stress and pushes the first frame 251 and the second frame 252 downwards, and the first frame 251 and the second frame 252 separately swing relative to the key cap 24. In another aspect, the key cap 24 downwards pushes the corresponding elastic element 26, so that the elastic element 26 deforms and presses the switch circuit board 27, so as to trigger a key connecting point (not shown) in the switch circuit board 27, so that the switch circuit board 27 outputs a corresponding key signal. At this time, the state of the key structure 2 is shown in FIG. 10.

When the user stops pressing the key cap 24, the key cap 24 is no longer under stress and stops pressing the elastic element 26, so that the elastic element 26 recovers to the original state due to elasticity and meanwhile provides an upward elastic restoring force to the key cap 24. At this time, the key cap 24 that moves upwards drives the first frame 251 and the second frame 252 to swing, and the key cap 24 is enabled to recover to the position before being pressed, as shown in FIG. 7. It should be specially noted that the second baseboard 22 does not move relative to the first baseboard 21 when the key cap 24 moves up and down.

When the user wants to shut down the notebook computer 3, the notebook computer 3 is changed to be in a shutdown mode and the power supply circuit 30 is turned off, so that the deformation element 23 no longer receives a voltage signal and therefore changes from an extended state to a bent state. Due to the bent state of the deformation element 23, the deformation element 23 pushes the second baseboard 22 to move in the second direction D2, the second frame 252 is dragged by the second baseboard 22, and the first frame 251 swings correspondingly, so that the key cap 24 is at the relatively shorter second height H2. Due to the reduction in the height of the key cap 24, the upper cover 32 of the notebook computer 3 can appropriately cover the base 31, so as to reduce the thickness of the covered notebook computer 3.

It should be specially noted that the keyboard of the present invention may also use the following configuration: when the notebook computer 3 is changed to be in a touch mode, the power supply circuit is set to stop providing a voltage signal to the deformation element, so as to facilitate reduction of the height of the key cap. In this way, touch of the key cap by mistake during holding may not occur to the notebook computer in a touch mode.

It can be learned from the above that in the keyboard of the present invention, the first baseboard and the second baseboard are connected by means of the deformation element, and the height of the key cap is changed according to the status of the deformation element. When a user wants to reduce the height of the key cap, the deformation element is controlled not to receive the voltage signal from the power supply circuit, so that the deformation element is changed to be in a bent state and pushes the second baseboard to move in a second direction, the second frame is dragged by the moving second baseboard, and the first frame swings correspondingly. Therefore, the height of the key cap can be reduced.

The above are only the preferable embodiments of the present invention, and the present invention needs not be limited to the disclosed embodiments. Therefore, all equivalent changes or modifications included within the spirit and scope of the present invention fall within the scope of the claims of the present invention.

What is claimed is:

1. A keyboard, disposed in a notebook computer, wherein the keyboard comprises:
   a first baseboard;
   a second baseboard, disposed at one side of the first baseboard;
   a deformation element, disposed between the first baseboard and the second baseboard, separately connected to the first baseboard, the second baseboard, and a power supply circuit of the notebook computer, and configured to deform according to a voltage signal provided by the power supply circuit;
   a key cap, located above the first baseboard, the second baseboard, and the deformation element and capable of moving relative to the first baseboard and the second baseboard; and
   a connecting element, separately connected to the key cap, the first baseboard, and the second baseboard, wherein the deformation element drags the second baseboard to move in a first direction when the deformation element receives the voltage signal and therefore deforms to be in an extended state, so that the key cap is at a first height; and the deformation element pushes the second baseboard to move in a second direction when the deformation element does not receive the voltage signal and therefore deforms to be in a bent state, so that the key cap is at a second height that is shorter than the first height.

2. The keyboard according to claim 1, wherein the connecting element comprises:

a first frame, a first end of the first frame being connected to the first baseboard, and a second end of the second frame being connected to the key cap; and a second frame, combined with the first frame and capable of swinging relative to the first frame, a first end of the second frame being connected to the key cap, and a second end of the first frame being connected to the second baseboard, wherein the deformation element drags the second baseboard to move in the first direction and the second frame is pushed by the second baseboard when the deformation element receives the voltage signal and therefore deforms to be in the extended state, so that the key cap is at the first height; and the deformation element pushes the second baseboard to move in the second direction and the second frame is dragged by the second baseboard when the deformation element does not receive the voltage signal and therefore deforms to be in the bent state, so that the key cap is at the second height that is shorter than the first height.

3. The keyboard according to claim 2, wherein the first baseboard comprises a plurality of first fixing portions, extending out of an upper surface of the first baseboard, and configured to fix the first end of the first frame to the first baseboard.

4. The keyboard according to claim 3, wherein each of the first fixing portions is integrally formed with the first baseboard.

5. The keyboard according to claim 2, wherein the second baseboard comprises a plurality of second fixing portions, extending out of an upper surface of the second baseboard, and configured to fix the second end of the second frame to the second baseboard.

6. The keyboard according to claim 5, wherein each of the second fixing portions is integrally formed with the second baseboard.

7. The keyboard according to claim 1, wherein the deformation element is made of a shape memory alloy.

8. The keyboard according to claim 1, wherein the first baseboard is fixed on the notebook computer, so that the second baseboard is capable of moving relative to the first baseboard according to a state of the deformation element.

9. The keyboard according to claim 1, further comprising:

a switch circuit board, disposed on the first baseboard, the second baseboard, and the deformation element, and configured to output a key signal corresponding to the key cap according to a movement of the key cap; and an elastic element, disposed between the key cap and the switch circuit board, and configured to be pushed by the key cap to trigger the switch circuit board, wherein when the key cap is no longer pressed, the elastic element provides an elastic force to the key cap, so that the key cap drives the connecting element to swing.

* * * * *